Nov. 23, 1937.  R. GROVES  2,100,137
CORN COMBINE
Filed March 7, 1934  5 Sheets-Sheet 3

Inventor
Roy Groves.
By Thos. H. Johnston
Attorney

Nov. 23, 1937.  R. GROVES  2,100,137
CORN COMBINE
Filed March 7, 1934  5 Sheets-Sheet 5

Inventor
Roy Groves.
By Thos. H. Johnston
Attorney

Patented Nov. 23, 1937

2,100,137

UNITED STATES PATENT OFFICE 2,100,137

CORN COMBINE

Roy Groves, Sylvia, Kans.

Application March 7, 1934, Serial No. 714,471

8 Claims. (Cl. 130—5)

This invention relates to an improved corn combine and seeks to provide a machine of this character adapted to gather ears of corn from the stalks, wherein the husks will be removed from said ears and discharged from the machine, wherein the ears of corn will be shelled, and wherein the shelled corn will be cleaned and deposited in a suitable container upon the machine.

Other and more detailed objects of the invention will appear during the course of the following description and in the drawings which form a part of this application, Figure 1 is a side elevation of my improved corn combine.

Figure 6 is a detail elevation showing the mounting of the tumbler shaft.

Figure 3:
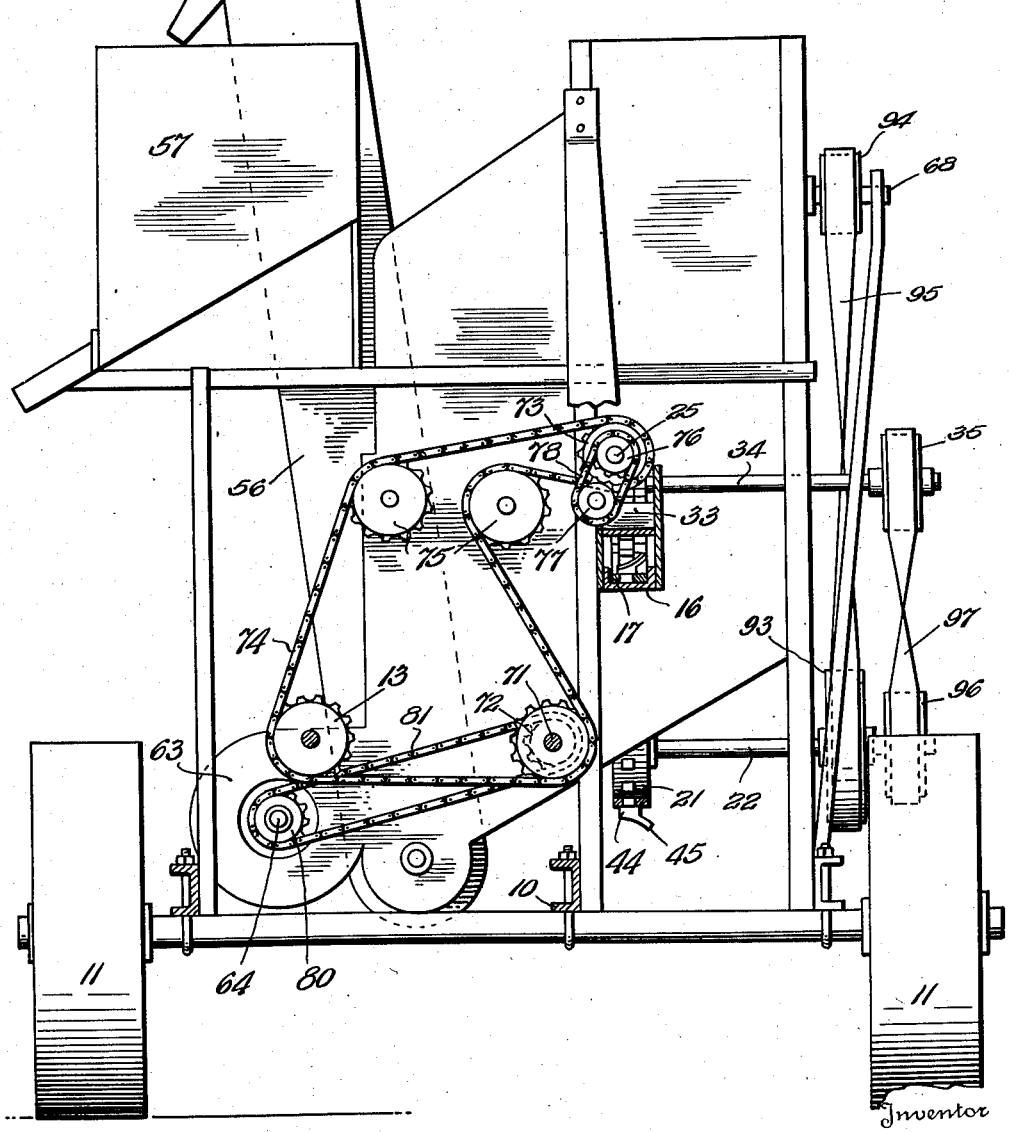
Figure 3 is a transverse section looking rearwardly and particularly showing some of the sprockets employed.

In carrying the invention into effect, I employ a chassis embodying a frame 10 supported by ground wheels 11 and suitably mounted on the frame is an appropriate motor 12 by which all of the driven parts are operated, the drive shaft of the motor being provided, as shown in Figure 3, with a sprocket 13.

Pivoted upon the forward portion of the frame 10 is a harvesting mechanism, indicated as a whole at 14, but as this mechanism forms no part of the present invention, it is unnecessary to describe said mechanism in detail. It may be noted, however, that the harvesting mechanism is angularly adjustable by means of a hand lever 15 and includes snapping rolls for stripping the ears of corn from the stalks and rolling the stalks downwardly under the machine, the ears of corn being delivered upwardly by said mechanism to a conveyer, now to be described.

Inclining upwardly from the harvesting mechanism is a conveyer trough 16 through which operates an endless conveyer chain 17 trained about an idler sprocket 18, a drive sprocket 19 on a shaft 20, and a second idler sprocket 21 on a shaft 22 located forwardly of and below the shaft 20. The conveyer chain travels through a shelling chamber 23 in which is mounted a husking and shelling roll 24 carried by a shaft 25, the roll being disposed horizontally above the chain. The roll 24 is equipped with pins 26 and at its ends with spirals 27 adapted to keep the ears of corn moving with the chain 17 as well as revolving so that said ears may be completely shelled.

Figure 1:
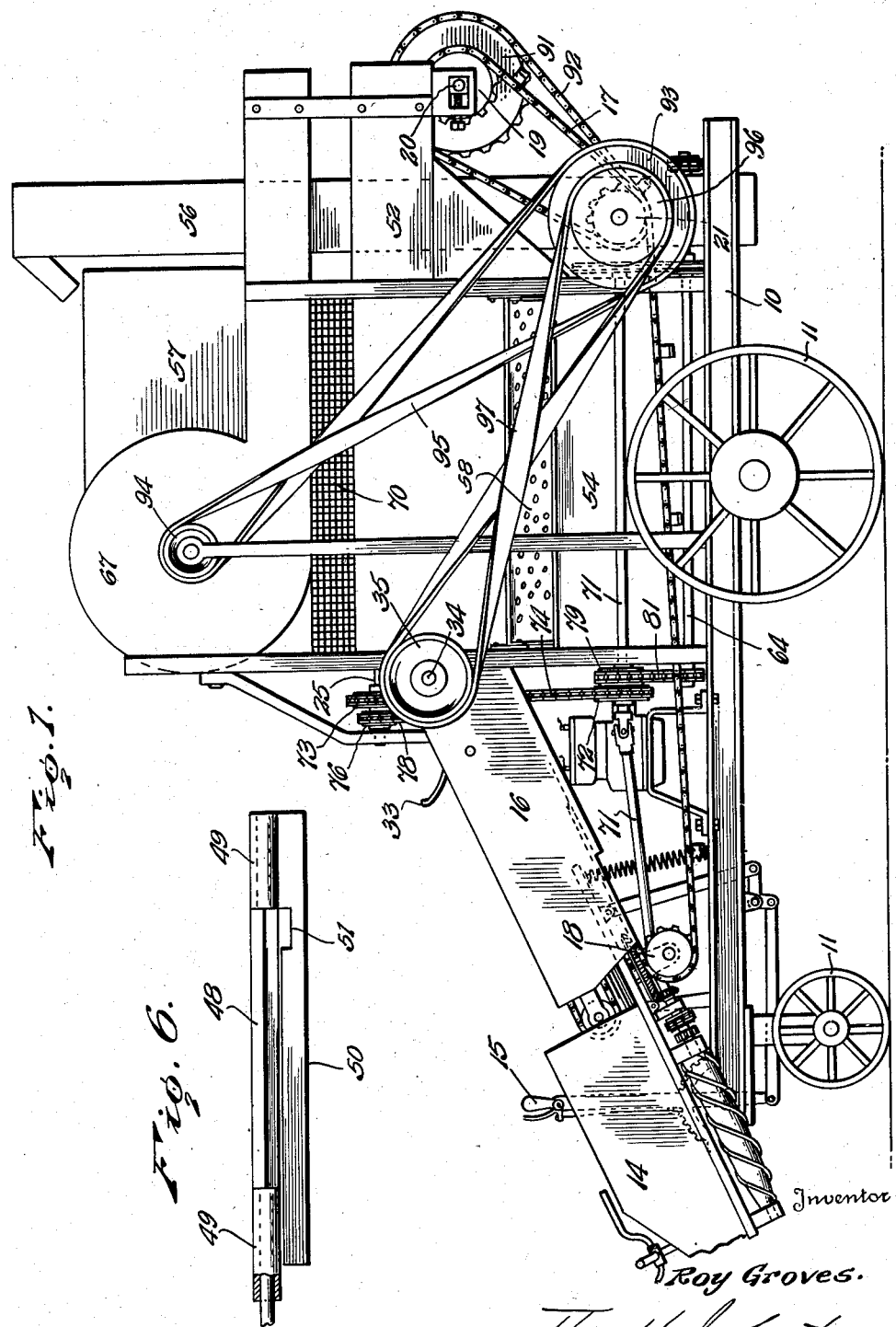

Ears of corn gathered by the harvesting mechanism 14 are deposited on the chain 17 and in order to facilitate the delivery of said ears to the shelling chamber 23, I provide a force feed endless chain 28 for operation above the chain 17. The chain 28 is trained about a drive sprocket 29 and an idler sprocket 30, which latter is carried by a member 31 pivoted at 32 so that the chain may be raised, as shown in dotted lines in Figure 2, to inactive position. Mounted above the pivot 32 is a shield 33 for the chain. The sprocket 29 is carried by a transverse shaft 34 and fixed to the outer end of said shaft, as seen in Figure 1, is a pulley 35.

Figure 5:
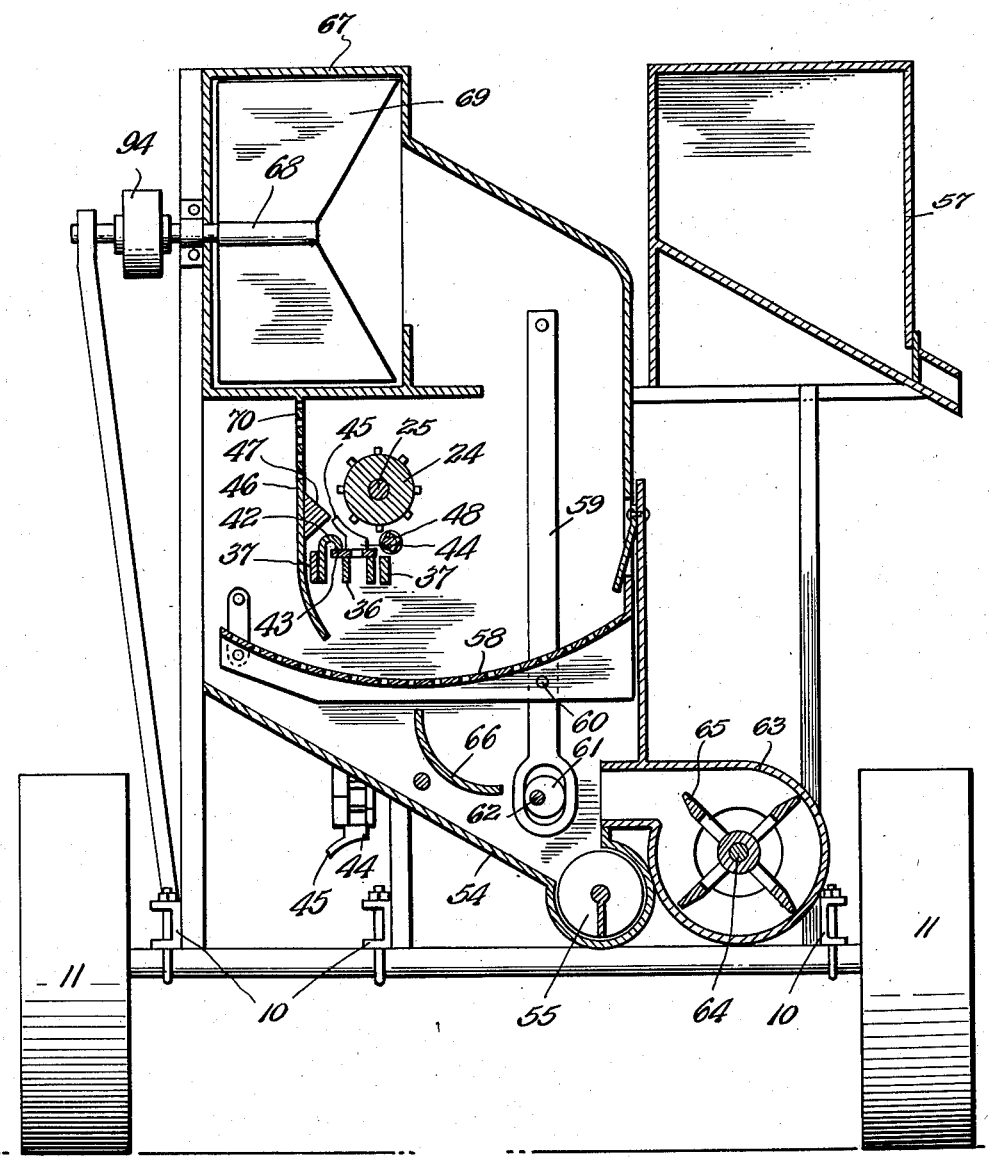
Figure 5 is a transverse section through the shelling chamber.

Pivoted at its forward end to extend beneath the roll 24 is a grate 36, the forward end portion of which is inclined at an angle with the trough 16, and mounted at opposite sides of the grate, as best seen in Figure 5 of the drawings, are guide bars 37. The conveyer chain 17 travels lengthwise of the grate thereon and disposed at the rear end of the grate is a hanger 38. This hanger is supported by a spring 39 which is disposed about a pin 40 and arranged beneath the spring is a nut 41. Thus, the spring 39 will yieldably sustain the free end of the grate to compensate for variation in the diameter of corn ears passing on the chain 17 between the grate and the roll 24. In any instance where there is a difference in the general size of corn ears, adjustment is made by turning the nut 41.

As shown in Figure 5, the grate 36 is provided at one side thereof with an overhanging wall 42 and formed on the links of the chain 17 are lateral flanges 43 movable beneath said wall to coact therewith for positively holding the chain in proper position as it travels beneath the roll 24. Preferably, about every ninth link of the chain 17 has fixed thereto an upstanding corn ear bearer member 44. These members are provided with fingers 45 which are curved outwardly and upwardly to conform to the roll 24.

The shelling chamber 23 is provided with a side wall 46 and fixed to said wall is a triangular strip 47, the exposed edge of which aligns with and is adjacent to the free ends of the fingers 45. The purpose of this strip is to keep the ears of corn on the chain 17 while passing under the roll 24. Rotatably mounted between the roll 24 and the chain 17 is a tumbler shaft 48, the intermediate portion of which is square in cross section and is adapted to keep the ears of corn rolling around as they move along under said roll.

As shown in detail in Figure 6 of the drawings, the shaft 48 is journaled by bearings 49 which provide stationary sleeves extending beneath the roll 24 for preventing husks from becoming entangled on the shaft, and fixed to one of said bearings is a bar 50 in which is formed a slot 51 to allow any husks which may wrap around the shaft to gather at said slot so that the roll 24 will tear them off.

Extending rearwardly from the chamber 23 is a trough 52 for the chain 17 which trough terminates directly above the sprocket 19, and sloping downwardly beneath said trough is a chute 53. The bottom of the trough 52 from the shelling chamber to a point above the upper edge of the wall of said chute is of screen which is adapted to permit any grains of corn carried by the chain 17 beyond the shelling chamber to fall into said chute. The chute directs the grains of corn onto a grain board 54 which, as best seen in Figure 5 of the drawings, leads to a screw conveyer 55 adapted to convey the shelled corn to an elevator 56 disposed to deposit the shelled corn in an elevated tank 57.

Mounted in the shelling chamber 23 below the grate 36 is a riddle 58 adapted to separate the shelled corn from any particles of cob which may be torn loose by the pins 26 of the roll 24. The riddle is operated by a shaker 59 pivoted at 60 to the riddle and mounted to oscillate the shaker is an eccentric 61 on a shaft 62.

Below the riddle 58 and at one side thereof is a housing 63 through which is mounted a fan shaft 64 carrying a fan 65 adapted to impel a blast of air under the riddle for carrying off husks and pieces of corn cob at the opposite side of the riddle and mounted below the riddle is a deflector 66. Located above the shelling chamber 23 is a housing 67 in communication with said chamber and extending into said housing is a shaft 68 carrying a suction fan 69. Mounted at the top of the wall 46 of the shelling chamber is a grating 70 through which air is drawn by the fan 69 across the top of the roll 24 for preventing husks from wrapping around said roll and, as will be noted, the deflector 66 will turn part of the air blast from the fan 65 up through the riddle 58 to keep the husks moving upward toward the suction fan 69 by which said husks and other debris will be discharged from the machine. The corn cobs travel with the chain 17 and are deposited on the ground or in a suitable box provided at the rear of the sprocket 19.

Figure 2:
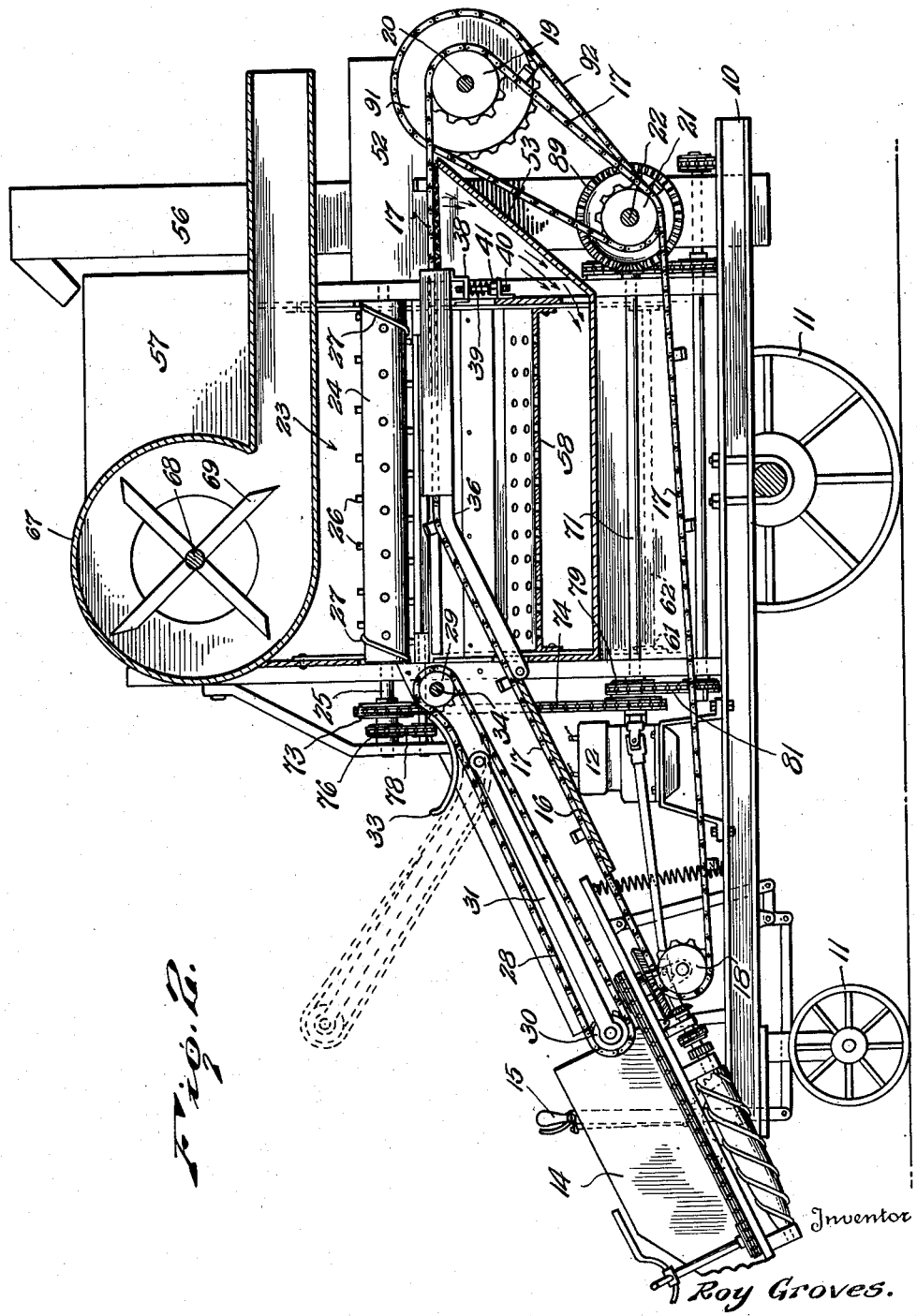
Figure 2 is a longitudinal vertical sectional view through the machine.

Extending longitudinally of the machine, as best seen in Figures 1 and 2 of the drawings, is a shaft 71 on which is a sprocket 72 and mounted on the shaft 25 of the husking and shelling roll 24 is a sprocket 73. Trained about the sprocket 13 of the motor drive shaft, as brought out in Figure 3, is a drive chain 74 which extends about the sprockets 72 and 73 and guiding the chain are idler sprockets 75. Thus, the roll 24 and shaft 71 will be driven by the motor. The shaft 25 of the roll 24 also carries a sprocket 76 while to the tumbler shaft 48 is fixed a sprocket 77 and trained about said sprockets is a chain 78 for driving the tumbler shaft. Fixed to the shaft 71 rearwardly of the sprocket 72, as best seen in Figure 2, is a sprocket 79 while to the forward end of the shaft 64 is fixed a sprocket 80 and trained about said sprockets is a chain 81 for driving the blower fan 65.

Figure 4:
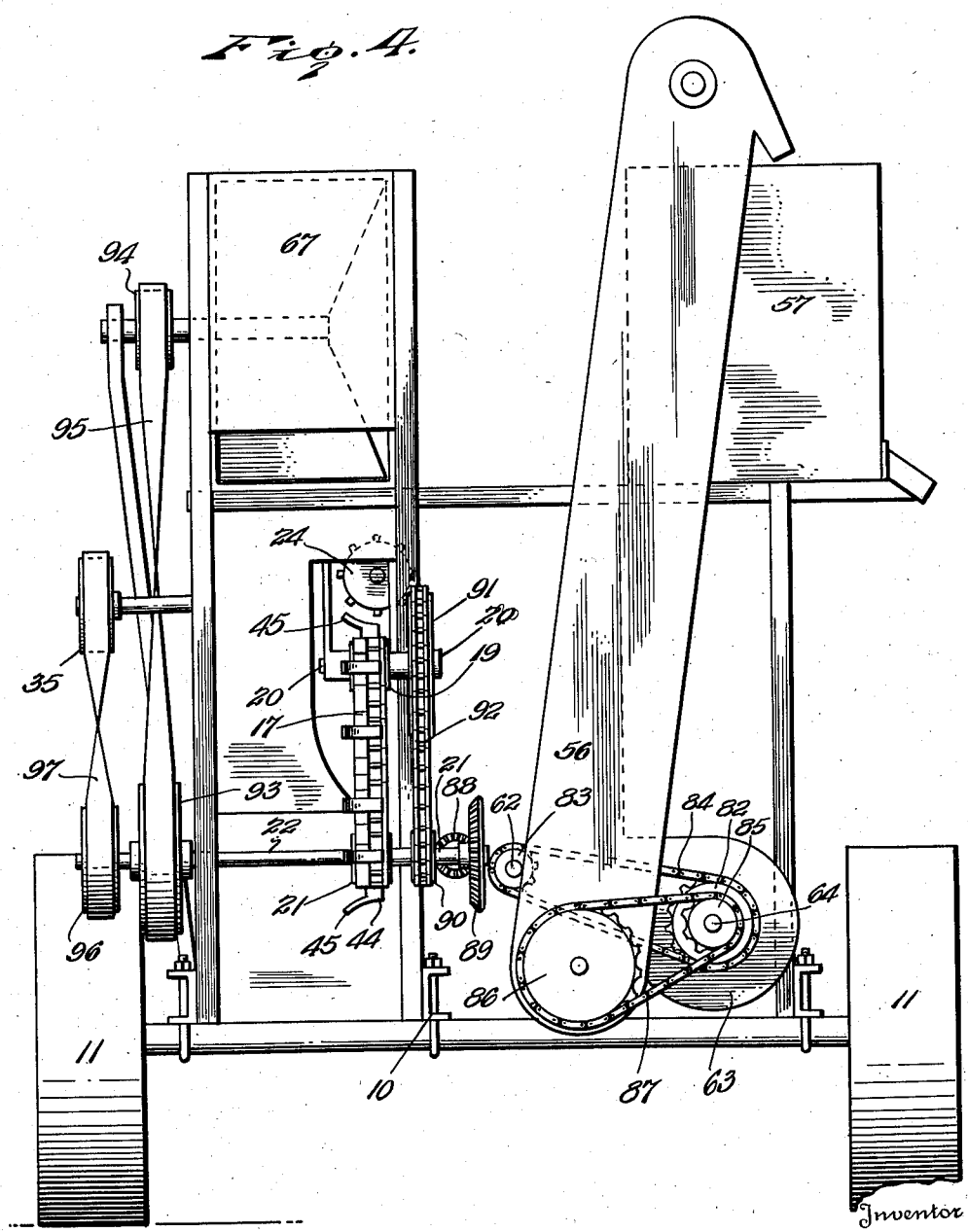
Figure 4 is a rear elevation.

Fixed to the rear end portion of the blower fan shaft 64, as best seen in Figure 4, is a sprocket 82 and fixed to the eccentric shaft 62 is a sprocket 83. Trained about said sprockets is a chain 84 for driving the eccentric shaft and oscillating the riddle 58. The rear end portion of the shaft 64 also carries a sprocket 85 while to the rear end of the shaft of the screw conveyer 55 is fixed a sprocket 86 and trained about said sprockets is a chain 87 for driving the screw conveyer and the elevator 56.

The shaft 71 is operatively connected at its forward end with the harvesting mechanism 14 for operating said mechanism and fixed to the rear end of said shaft is a beveled gear 88 meshing with a beveled gear 89 on the shaft 22. Fixed to the shaft 22 is a sprocket 90 while to the shaft 20 is fixed a sprocket 91 and trained over said sprockets is a chain 92 for driving the conveyer chain 17.

Mounted on the outer end portion of the shaft 22 is a pulley 93 opposite which is a pulley 94 on the shaft 68 of the suction fan 69 and engaged about said pulleys is a belt 95 for driving said fan. The shaft 22 also carries a pulley 96 and engaged about said pulley and the pulley 35 on the shaft 34 is a belt 97 for driving the force feed chain 28. Accordingly, as will be seen, all of the mechanism is operated by the motor 12.

Having thus described the invention, I claim:

1. In a corn combine, a conveyer for receiving gathered ears of corn, a husking and shelling chamber, a husking and shelling roll mounted in said chamber adjacent said conveyer to engage the ears of corn thereon, said chamber being provided at a point laterally of the roll with an opening above the roll and being further provided at the top of the chamber with a second opening located at the side of the roll opposite said first mentioned opening, and a suction fan mounted to draw air through said openings and through said chamber transversely across the roll thereabove for evacuating husks from said chamber.

2. In a corn combine, a conveyer for receiving gathered ears of corn, a trough in which the conveyer travels, a husking and shelling roll mounted adjacent the conveyer to engage ears of corn thereon, said conveyer being provided with spaced upstanding corn ear bearer members having fingers thereon curved outwardly and upwardly to conform to the roll, flanges on the conveyer, and a grate in the trough beneath the roll and provided with an overhanging wall to coact with said flanges for holding the conveyer in position beneath said roll.

3. In a corn combine, a conveyer for receiving gathered ears of corn, a trough in which the conveyer travels, a husking and shelling roll mounted adjacent the conveyer to engage ears of corn thereon, a grate in the trough beneath said conveyer and upon which the conveyer travels, and means for urging the grate to act on the conveyer for holding corn ears against said roll.

4. In a corn combine, a conveyer for receiving gathered ears of corn, a trough in which the conveyer travels, a husking and shelling roll mounted adjacent the conveyer to engage ears of corn thereon, a grate in the trough beneath said conveyer and upon which the conveyer travels, said grate being pivoted at one end, a spring yieldably supporting the grate at its opposite end whereby the grate may recede to accommodate corn ears of different sizes between the conveyer and said roll, and adjustable means supporting the spring.

5. In a corn combine, a conveyer for receiving gathered ears of corn, a husking and shelling roll mounted adjacent the conveyer to engage the ears of corn thereon, a riddle disposed to receive the shelled corn, a blow fan for forcing a current of air beneath the riddle for discharging refuse at one end of the riddle therebeneath, and a deflector mounted to divert a portion of said air current through the riddle.

6. In a corn combine, a conveyer for receiving gathered ears of corn, a husking and shelling chamber, a husking and shelling roll mounted in said chamber adjacent the conveyer to engage ears of corn thereon, a riddle disposed to receive the shelled corn, a suction fan for drawing currents of air transversely through the chamber across the roll thereabove as well as upwardly through the chamber in contact with the roll, a blow fan for forcing a current of air beneath the riddle for discharging refuse at one end of the riddle therebeneath, and a deflector for diverting a portion of the forced air current through the riddle and through said chamber from the bottom thereof.

7. In a corn combine, a conveyer for receiving gathered ears of corn, a husking and shelling roll mounted adjacent the conveyer to engage ears of corn thereon, a trough in which said conveyer travels, a grate in said trough, a grain board disposed to receive shelled corn falling through the grate, a screen in said trough in the rear of said roll and over which the conveyer travels, a chute for directing shelled corn falling through the screen onto the grain board, and a conveyer disposed to receive shelled corn from said grain board.

8. In a corn combine, a conveyer for receiving gathered ears of corn, a husking and shelling roll mounted adjacent said conveyer to engage the ears of corn thereon, and a tumbler shaft disposed between the conveyer and said roll to engage the ears of corn and impart rotary motion thereto, said shaft being provided at its ends with stationary sleeves extending beneath the roll for preventing husks from becoming entangled on the shaft.

ROY GROVES.